United States Patent [19]
Blumenau

[11] Patent Number: 6,032,224
[45] Date of Patent: Feb. 29, 2000

[54] HIERARCHICAL PERFORMANCE SYSTEM FOR MANAGING A PLURALITY OF STORAGE UNITS WITH DIFFERENT ACCESS SPEEDS

[75] Inventor: Steven M. Blumenau, Holliston, Mass.

[73] Assignee: EMC Corporation, Hopkinton, Mass.

[21] Appl. No.: 08/757,124

[22] Filed: Dec. 3, 1996

[51] Int. Cl.[7] .................................................. G06F 12/08
[52] U.S. Cl. ........................... 711/117; 711/167; 710/58; 710/60; 710/16; 710/15
[58] Field of Search .................................. 711/117, 154, 711/159, 202, 203, 206, 207, 208, 167; 395/200.47, 200.48, 200.49; 710/58, 60, 15, 16, 25

[56] References Cited

U.S. PATENT DOCUMENTS

| | | | |
|---|---|---|---|
| 4,703,422 | 10/1987 | Kinoshita et al. | 711/117 |
| 5,235,601 | 8/1993 | Stallmo et al. . | |
| 5,305,438 | 4/1994 | MacKay et al. . | |
| 5,337,414 | 8/1994 | Heshemi et al. . | |
| 5,390,187 | 2/1995 | Stallmo . | |
| 5,398,253 | 3/1995 | Gordon . | |
| 5,423,018 | 6/1995 | Dang et al. | 711/159 |
| 5,435,004 | 7/1995 | Cox et al. . | |
| 5,440,686 | 8/1995 | Dahman et al. | 345/511 |
| 5,440,712 | 8/1995 | Takeda et al. | 711/117 |
| 5,463,772 | 10/1995 | Thompson et al. . | |
| 5,495,457 | 2/1996 | Takagi | 369/30 |
| 5,495,607 | 2/1996 | Pisello et al. . | |
| 5,497,457 | 3/1996 | Ford . | |
| 5,499,337 | 3/1996 | Gordon . | |
| 5,504,858 | 4/1996 | Ellis et al. . | |
| 5,544,343 | 8/1996 | Swenson et al. | 711/133 |
| 5,559,984 | 9/1996 | Nakano et al. | 711/121 |
| 5,737,577 | 4/1998 | Martini | 711/173 |

Primary Examiner—B. James Peikari
Attorney, Agent, or Firm—Fish & Richardson P.C.

[57] ABSTRACT

A computer having capabilities for hierarchical storage of data, said computer including an interpreter that maps logical user read and write requests to physical block level read and write requests, and a hierarchical performance driver having a disk driver interface for receiving the block level read and write requests from the interpreter, the hierarchical performance driver issuing instructions to read and write data from plural data storage devices in response to block level read and write requests, plural data storage devices having different data access speeds, the hierarchical performance driver monitoring the rates of access of blocks of data stored on the data storage devices and transferring blocks of data accessed infrequently from a faster data storage device to a slower data storage device.

27 Claims, 5 Drawing Sheets

HIERARCHICAL PERFORMANCE SYSTEM FOR MANAGING A PLURALITY OF STORAGE UNITS WITH DIFFERENT ACCESS SPEEDS

CROSS REFERENCE TO RELATED APPLICATIONS

Patent applications entitled "Restoration of Data Backed up on Archive Media," Ser. No. 08/753,952, "Backing Up Computer Data," Ser. No. 08/757,125, "Mirroring Computer Data," Ser. No. 08/757,123, and "Redundant Storage of Computer Data" 08/757,122, filed by me concurrently herewith, are incorporated herein by reference.

BACKGROUND OF THE INVENTION

The invention relates to the storage of data used by a computer.

A computer typically accesses data in files stored on various media having different rates of access associated with them. A computer's solid state disk and local disk often permit the quickest access and would desirably be used for files that are frequently accessed. The computer might store files rarely used on a tape library that is accessed over a computer network.

It is known to provide hierarchical storage management systems to automatically move less used data files to slower storage devices as the faster storage devices fill up beyond set storage levels. Such systems have a goal of "infinite storage." Typically the contents of files are moved from a local disk to an archive medium such as tape, and a special file name is left on the system, sometimes referred to as a "stub." The special file name looks like a normal file name, but, when it is accessed, the hierarchical storage system is informed to retrieve the information from tape and load it back onto the local disk. The I/O requests are then satisfied from the local disk.

The term "logical level" refers to data as seen by the user application programs in files or database tables. The term "physical level" refers to data as stored in "blocks" (there typically are a number of blocks in each file) at specific locations on some physical medium, e.g., a host computer disk. Typically the computer's operating system (e.g., UNIX or DOS) includes a file system that does mapping between the logical level and the physical level.

SUMMARY OF THE INVENTION

In one aspect, the invention features, in general, a computer having capabilities for hierarchical storage of data. The computer includes an interpreter (e.g., a file system or a database application) that does logical to physical mapping and a hierarchical performance driver that has a disk driver interface that receives physical block level read and write requests from the interpreter. The hierarchical performance driver issues instructions to read and write data from a plurality of data storage devices in response to the block level read and write requests. The data storage devices have different data access speeds (i.e., some are faster than others). The hierarchical performance driver monitors the rates of access (i.e., the usage by the user applications) of blocks of data stored on the data storage devices and transfers blocks of data from one data storage device to a another data storage device as a function of the monitored rates of access for the blocks.

In another aspect the invention features, in general, a computer system including a network, a computer that is connected to the network and has one or more local data storage devices, and one or more remote data storage devices connected to the network. The computer also includes an interpreter and a hierarchical performance driver as have already been described.

In another aspect, the invention features, in general, a computer implemented method of providing hierarchical storage of data. An interpreter maps logical user read and write requests to physical block level read and write requests. A hierarchical performance driver having a disk driver interface receives the physical block level read and write requests from the interpreter and issues instructions to read and write data from a plurality of data storage devices in response to the block level read and write requests. The plurality of data storage devices have different data access speeds. The hierarchical performance driver monitors the rates of access for particular blocks of data stored on the data storage devices, and transfers blocks of data from one data storage device to another data storage device as a function of the monitored rates of access.

In another aspect, the invention features, in general, a computer program that resides on a computer-readable medium and includes instructions causing the computer to create a hierarchical performance driver as has already been described.

In another aspect, the invention features, in general, a computer implemented method of providing hierarchical storage of data that includes monitoring the rates of access for particular physical blocks of data stored on a plurality of data storage devices.

Certain implementations of the invention may include one or more of the following features. In certain implementations the hierarchical performance driver maintains a location map table that maps block numbers provided by the interpreter to physical blocks at relevant storage devices at which the data are actually stored. The hierarchical performance driver maintains an access rate table for each storage device, the table identifying blocks within the storage device and the number of accesses per unit time for each block. A storage device access rate that defines a threshold that triggers moving a block from one storage device to another is assigned to each storage device. The storage device access rate for a storage device is adjusted in response to access rates of blocks in the next fastest storage device.

In some implementations, the interpreter is a file system of an operating system of the computer, and in some other implementations the interpreter is a database server application. The plurality of data storage devices include local data storage devices and remote data storage devices. The computer includes a remote storage access system, and the hierarchical performance driver has an operating system device driver application programming interface to the remote storage access system, the remote storage access system being implemented in the user space of the computer and communicating with the remote data storage devices. The remote storage access system and the hierarchical performance driver communicate via IOCTL messages, an operating system API allowing communication between an application and a driver. The computer also has local storage drivers that receive the read and write instructions and provide control signals to control respective local storage devices. The local storage devices include a solid state disk, a local disk, and a local tape.

Embodiments of the invention may include one or more of the following advantages. Because the hierarchical performance driver moves data on a physical block basis, as opposed to a logical file basis, it can efficiently move the lesser used blocks of a large file to a slower remote device, and maintain the frequently used portion of a file on a local storage device.

Other advantages and features of the invention will be apparent from the description of preferred embodiments of the invention and from the claims.

DESCRIPTION OF THE PREFERRED EMBODIMENTS

Figure 1:
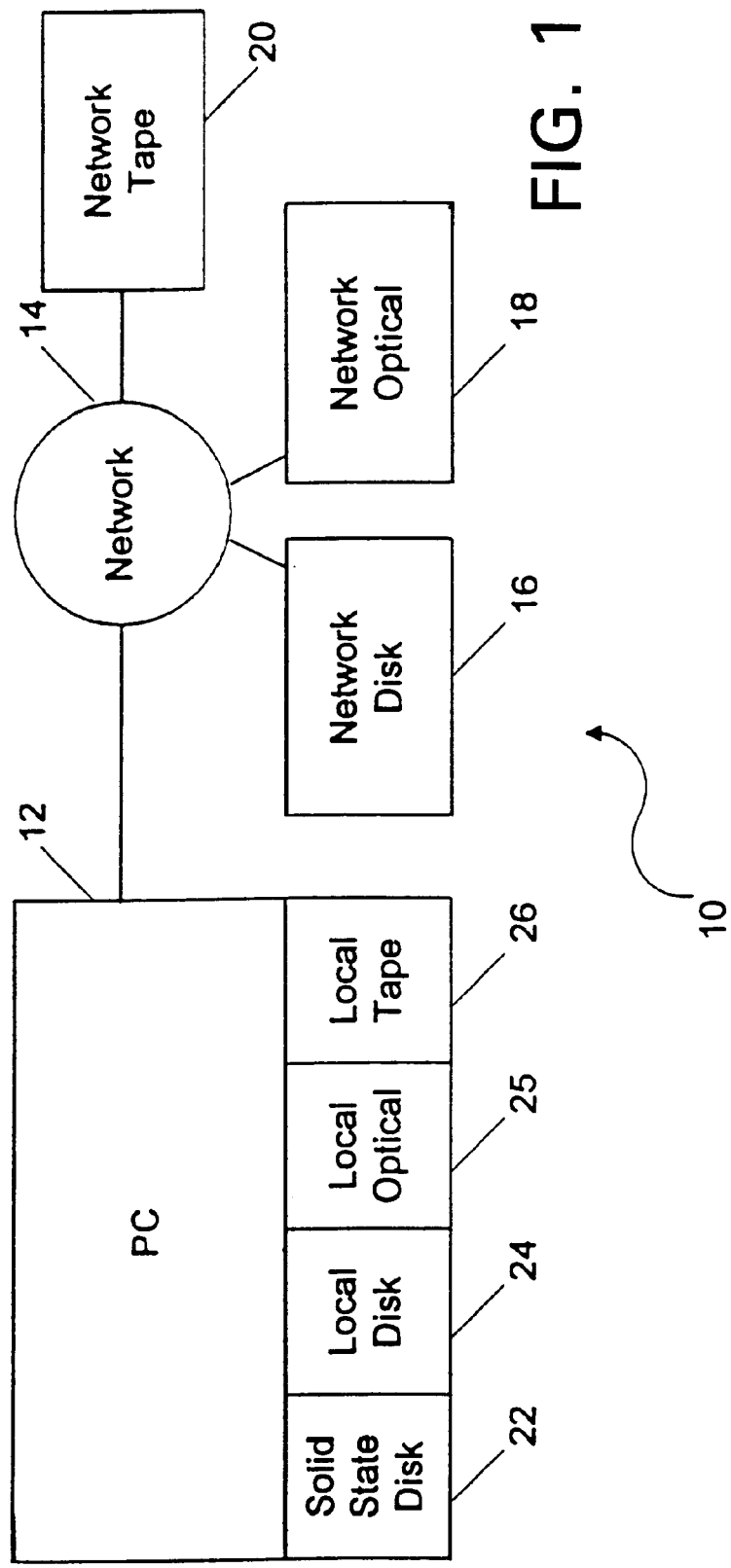
FIG. 1 is a block diagram of a system providing hierarchical storage of data.

FIG. 1 shows hierarchical performance system 10 for storing data accessed by desktop computer 12, which is connected to network 14. The data accessed by computer 12 are stored on a plurality of remote storage devices connected to network 14, namely, network disk 16, network optical 18, and network tape 20, and local storage devices, namely, solid state disk 22, local disk 24, local optical 25, and local tape 26.

Figure 2:
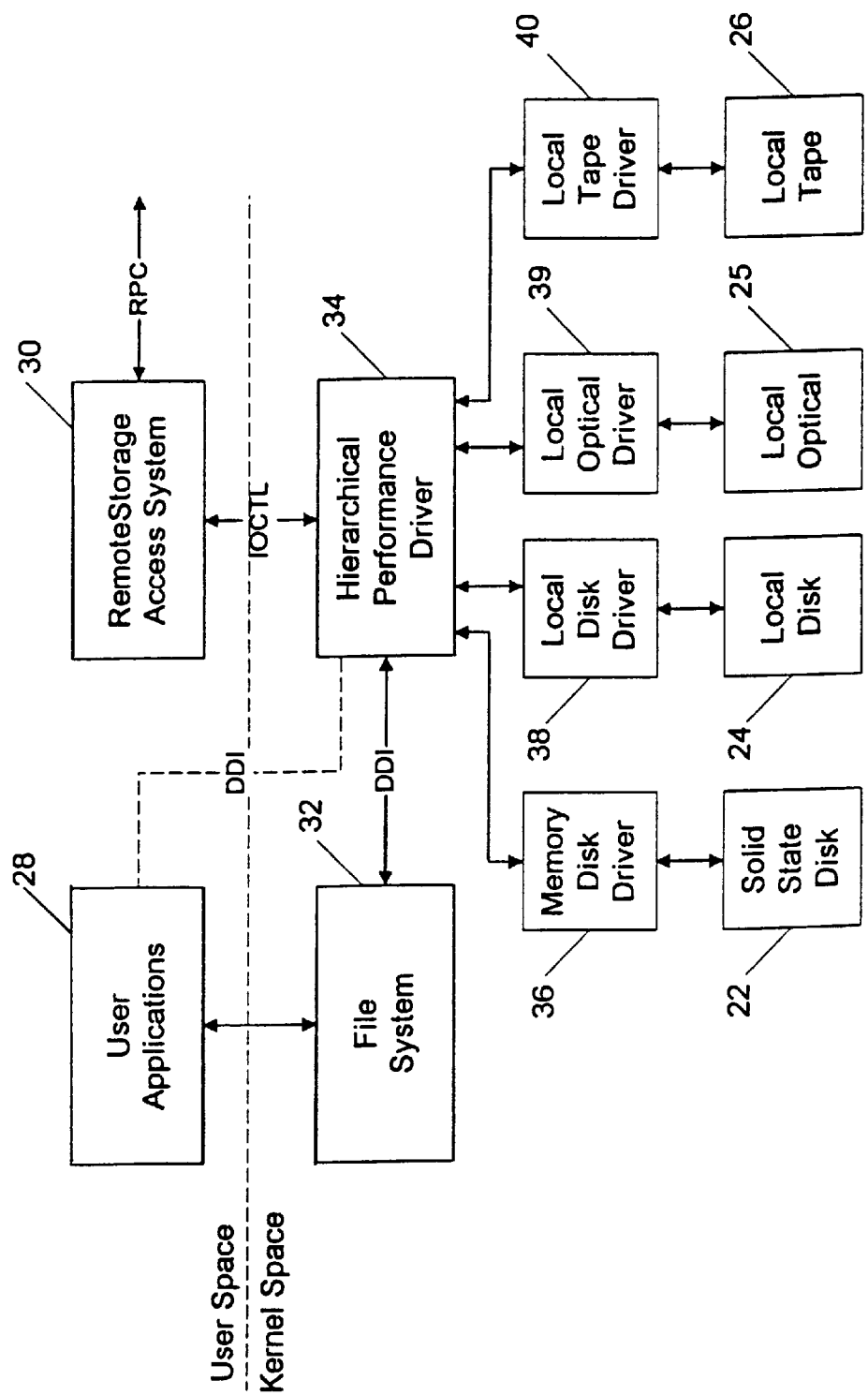
FIG. 2 is a block diagram showing the software architecture for a personal computer of the FIG. 1 system.

Referring to FIG. 2, computer 12 includes user applications 28 and remote storage access system 30 in the user application space of the computer. As also shown in FIG. 2, computer 12 includes file system 32 (e.g., the file system present in a UNIX Bell Laboratories operating system), hierarchical performance driver 34, memory disk driver 36, local disk driver 38, and local tape driver 40 in the kernel space of the computer. Drivers 36, 38, 39, 40 respectively control solid state disk 22, local disk 24, local optical 25, and local tape 26. Local storage drivers 36, 38, 39, 40 receive instructions from hierarchical performance driver 34 and provide control signals to control respective local storage devices 22, 24, 25, 26. Remote storage access system 30 is connected to communicate with remote storage devices 16–20 through network 14.

File system 32, memory disk driver 36, local disk driver 38, solid state disk 22, and local disk 24 are common components of a computer. File system 32, memory disk driver 36, local disk driver 38, local operating system 39, and local tape driver 40 are provided on the operating system of a computer, and disks 22, 24 and tape 26 are the real, physical media on which the data are actually stored. A "block" of data (which might be 512 or 1K bytes or larger depending on the computer and the media type) is the smallest set of data that can be accessed on the physical media. File system 32 carries out a logical to physical mapping; given a file name, it accesses file tables to convert a file name to a set of physical block numbers. The file tables, which are stored along with actual data on disk 24, identify, for each file name, the starting block and the number of blocks in the file. Hierarchical performance driver 34 does a further mapping of the block numbers provided by file system 32 to physical blocks at the actual storage devices at which the blocks are stored.

Network tape 20 is a tape library including a plurality of tapes and drives to access the tapes.

Figure 4:
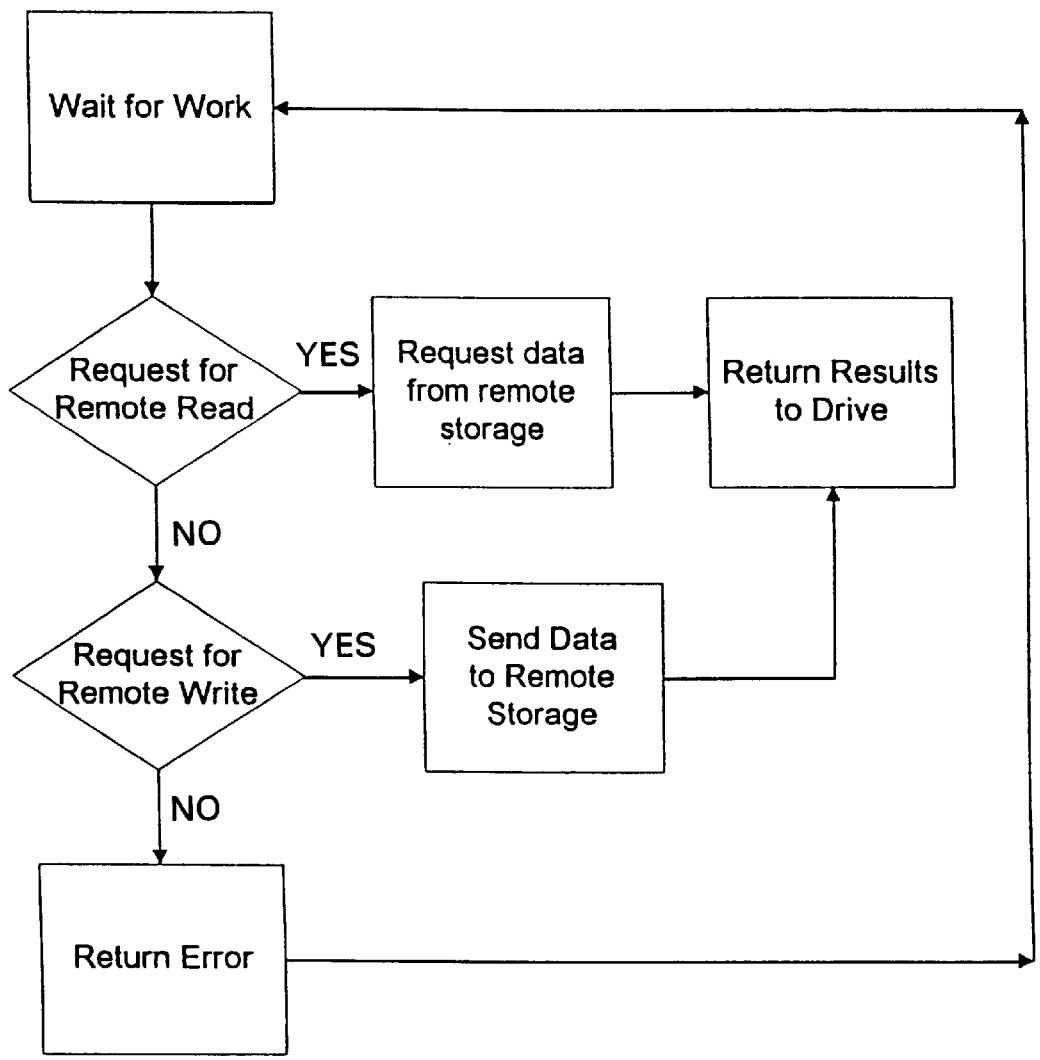
FIGS. 4 and 5 are flow charts showing the steps employed by a remote storage access system and a hierarchical performance driver of the FIG. 1 system.

Remote storage access system 30 processes both read and write requests and has a remote procedure call (RPC) interface for receiving computer data from and for transmitting computer data to remote storage devices 16, 18, 20. FIG. 4 is a flow chart showing the steps employed by remote storage access system 30.

Figure 5:
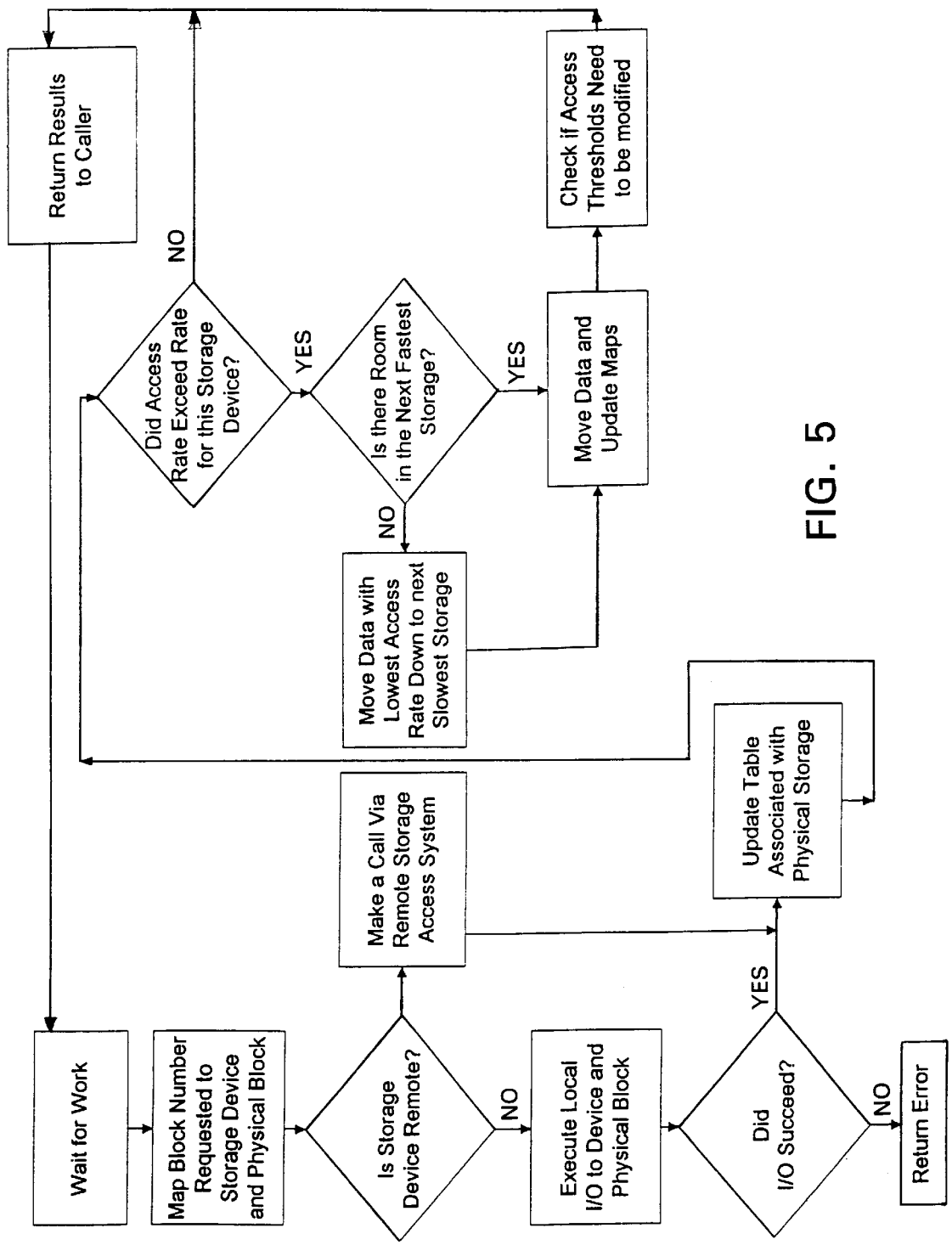

Hierarchical performance driver 34 has an operating system device driver application programming interface to remote storage access system 30 and a disk driver interface (DDI) to file system 32. Hierarchical performance driver 34 looks like a disk driver to file system 32, but its function is to transfer data to drivers 36–40 for the local storage devices 22–26 and transfer data to the remote storage devices 16–20 and to monitor the rates of access of blocks of stored data by computer 12 in order to move blocks with faster access rates to faster storage devices and blocks with lower access rates to slower storage devices. File system 32 identifies the physical blocks that it wants to hierarchical performance driver 34. Once a read request specifying a particular block of a file is passed from file system 32, hierarchical performance driver 34 determines where the block is located and then accesses the appropriate driver (for local storage devices) or communicates a return of the output control ("IOCTL") call (see discussion below) to remote storage access system 30. Hierarchical performance driver 34 then returns the data to file system 32. FIG. 5 is a flow chart showing the steps employed by hierarchical performance driver 34.

Remote storage access system 30 and hierarchical performance driver 34 can communicate with each other, in a Unix operating system environment, via IOCTL messages, which have the following format: (operation, address given buffer, optional arguments). When first started up, remote storage access system 30 makes an IOCTL call to hierarchical performance driver 34; there would initially not be a return of the call, because there would not be any requests to process. When there is a pending request, the IOCTL call is returned by hierarchical performance driver 34, and remote storage access system 30 looks at the return values of the IOCTL, which specify whether the operation is a read or write, and the starting block number. In addition, if the operation is a read, the return includes the number of blocks; if the operation is a write, the return includes the data being written. In a read operation, remote storage access system 30 goes out to the appropriate remote storage device 16–20, gets the data, and then makes another IOCTL call to hierarchical performance driver 34 to pass on the results of the read request. This IOCTL call passes back the starting block, the number of blocks, and the data. Remote storage access system 30 then sends another IOCTL call and waits for hierarchical performance driver 34 to return the IOCTL return when there is another request to process.

In operation, when there is a request for information in a file by a user application 28, file system 32 accesses the appropriate file table and converts the request to the block numbers by using the mapping information that had been previously stored. File system 32 communicates with hierarchical performance driver 34 to obtain the data beginning at a starting block and continuing for a number of blocks as if hierarchical performance driver 34 were a conventional host storage driver. Referring to FIG. 5, hierarchical performance driver 34 in turn maps the block numbers into storage locations and physical blocks via reference to a "location map table" and then accesses the appropriate local media 22–26 via respective local drivers 36–40, for blocks of data stored locally, or accesses the appropriate remote storage device 16–20, via remote storage access system 30, for blocks of data stored remotely. In the latter case, remote storage access system 30 now passes on the block information to obtain the data, and returns the data to hierarchical performance driver 34. Hierarchical performance driver 34 then returns the data to file system 32.

Figure 3:
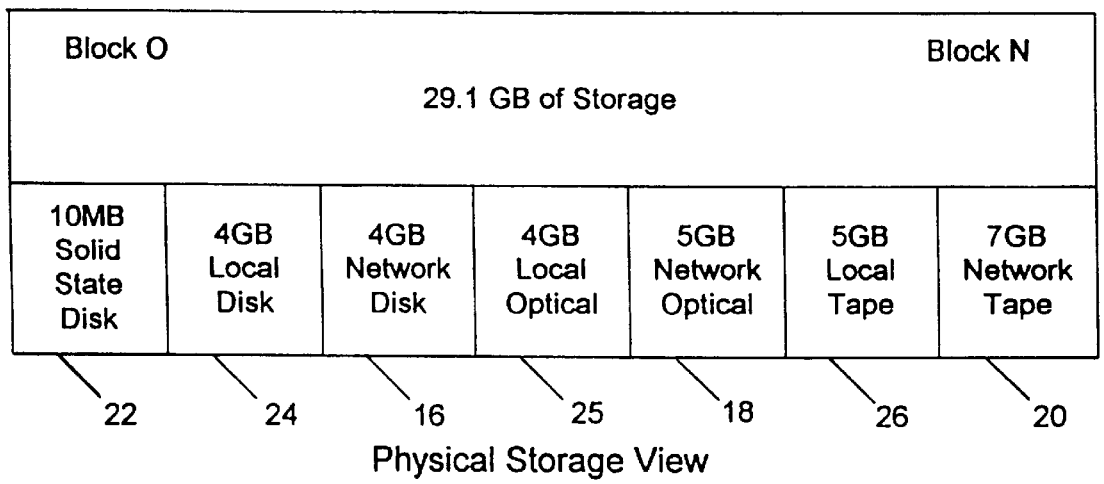
FIG. 3 is a diagram showing the user's view of data storage for the FIG. 2 personal computer.

FIG. 3 shows the storage for accessible data as seen by the user applications 28. Storage devices 16, 18, 20, 22, 24, 25 and 26 are arranged with the faster access devices to the left and the slower to the right. Hierarchical performance driver 34 monitors the rates of access for each block that is stored (where rate of access is the number of accesses made on that block per unit time), and additionally monitors the fill levels of the various storage devices. Referring to FIG. 5, each time that a block is read or written by hierarchical performance driver 34, a block level "access rate table" for the relevant storage device is updated. The table lists the block within the storage device and the rate of access, e.g., number of accesses per unit time. In addition, each storage device has assigned to it a "storage device access rate," which is a rate that defines a threshold that triggers moving information from one storage device to another. Thus, if updating of an access rate table causes the access rate for a particular block to exceed the storage device access rate, hierarchical performance driver 34 checks as to whether there is room in the next faster data storage device for storing the block. If so, the block is then moved. If not, the block in the faster storage device with the lowest access rate is moved to the next slower storage device before moving the data to the freed-up space in the faster storage device if it has an access rate that is less than the access rate for the block to move up. As each block is moved, the location map table is updated, and the access rate tables for the relevant storage devices are updated. In addition, hierarchical performance driver 34 checks as to whether the storage device access rate should be modified. E.g., if all blocks in a storage device were above the storage device access rate for the next slower storage device, and the block with the lowest access rate is moved to a slower device to free up room for data to be inserted, that block will have an access rate above the rate for the slower device; this factor will cause hierarchical performance driver 34 to consider moving the block back up to the faster device after moving down another block. A condition known as thrashing can be avoided by increasing the storage device access rate for the slower device.

As a result of the monitoring of access rates and movement of blocks by hierarchical performance driver 34, data that are accessed less tend to migrate to a slower storage device (i.e., to a device to the right on FIG. 3) and data that are accessed more tend to migrate to a faster storage device.

Because hierarchical performance driver 34 moves data on a physical block basis, as opposed to a logical file basis, it can efficiently move the frequently used blocks of a large file to a faster local device, and maintain the infrequently used portion of a file on a remote storage device. E.g., if there is a single block in a 100 block file that is accessed at a high rate, 100 blocks of high performance storage would be needed using a file level approach. In contrast, working at the block level allows the single block in the 100 block file to reside in the high performance storage while the rest of the file resides in a lower performance storage media.

Hierarchical performance system 10 provides a high-performance I/O mix for any given file. This is especially important in dealing with large databases. A database has index information that is used to look up data and it also has the actual user data. The index information is used by the software much more often than the amount of data that the index information references. In addition, within the index information, there is a portion that represents the active data set that is accessed much more often than other index information. The goal of performance is met by making the more often accessed data reside in the faster media. E.g., the highest accessed index information resides in a solid state disk while the rest of the index information resides on a local disk. This creates an environment where the database spreads itself out over a set of storage media that matches the access demands. The database also adapts to any changes in the access patterns of the users. This avoids the problem that can occur with databases as they get larger, namely, the new information, both index and data, will be stored in the next available storage, which could be on remote storage, even though the most recently entered data usually has the highest access rates. Hierarchical performance system 10 monitors the access rates of the data, and the frequently accessed index and data information will move to faster media while the other data will move to a slower media as storage space is needed.

Other Embodiments

Other embodiments of the invention are within the scope of the appended claims. E.g., in a computer where a user application 28 is a database server application that does logical to physical mapping on a so-called raw partition that bypasses file system 32, hierarchical performance driver 34 would communicate directly with the database server application 28, as is indicated by the dashed line on FIG. 2. In this case the database server application 28 would be considered the interpreter.

Also, hierarchical performance driver 34 could monitor fill levels of storage devices and move the least accessed data in a storage device to a slower device upon reaching a fill level, e.g., 80% full. This approach could be used in lieu of or in combination with the storage access rate thresholds already described.

What is claimed is:

1. A computer having capabilities for hierarchical storage of data stored on plural data storage devices comprising physical media, said computer comprising an interpreter that maps logical user read and write requests to physical block level read and write requests, each block being the smallest set of data that can be accessed on said physical media, said physical block level read and write requests indicating block numbers for data being requested, and a hierarchical performance driver having a disk driver interface for receiving said block level read and write requests from said interpreter, said hierarchical performance driver mapping said block numbers into physical blocks at relevant storage devices at which the blocks are actually stored, said hierarchical performance driver issuing instructions to read and write data from said plural data storage devices in response to said block level read and write requests, said plural data storage devices having different data access speeds, said hierarchical performance driver monitoring the rates of access of blocks of individual data stored on said data storage devices and transferring blocks of data from one said data storage device to another said data storage device as a function of the monitored rates of access.

2. The computer of claim 1 wherein said hierarchical performance driver maintains a location map table mapping said block numbers provided by said interpreter to said physical blocks at relevant storage devices at which the blocks are actually stored.

3. The computer of claim 1 wherein said hierarchical performance driver maintains an access rate table for each said storage device, said access rate table listing blocks within the storage device and a rate of access specifying the number of accesses per unit time for each block.

4. The computer of claim 3 wherein each storage device has assigned to it a storage device access rate that defines a threshold that triggers moving a block from one storage device to another.

5. The computer of claim 4 wherein said hierarchical performance driver adjusts said storage device access rates for a storage device in response to rates of access for blocks in the next fastest storage device.

6. The computer of claim 1 wherein said interpreter comprises a file system of an operating system of said computer.

7. The computer of claim 1 wherein said interpreter comprises a database server application.

8. The computer of claim 1 wherein said plural data storage devices include local data storage devices and remote data storage devices, and further comprising a remote storage access system, said hierarchical performance driver also having an operating system device driver application programming interface to said remote storage access system, said remote storage access system being implemented in the user space of said computer and communicating with said remote data storage devices.

9. The computer of claim 8 wherein said remote storage access system and said hierarchical performance driver communicate via IOCTL messages.

10. The computer of claim 1 wherein said plural data storage devices include local data storage devices and remote data storage devices, and further comprising local storage drivers that receive said instructions and provide control signals to control respective said local storage devices.

11. The computer of claim 10 wherein said local storage devices include a solid state disk and a local disk.

12. The computer of claim 10 wherein said local storage includes a local tape.

13. A computer implemented method of providing hierarchical storage of data stored on plural data storage devices comprising physical media, said method comprising mapping logical user read and write requests to physical block level read and write requests at an interpreter of said computer, each block being the smallest set of data that can be accessed on said physical media, said physical block level read and write requests indicating block numbers for data being requested, receiving said block level read requests from said interpreter at a hierarchical performance driver having a disk driver interface, said hierarchical performance driver mapping said block numbers into physical blocks at relevant storage devices at which the blocks are actually stored, issuing, at said hierarchical performance driver, instructions to read and write data from said plural data storage devices in response to said block level read and write requests and said mapping of block numbers, said plural data storage devices having different data access speeds, monitoring, at said hierarchical performance driver, the rates of access for individual blocks of data stored on said data storage devices, and transferring blocks of data from one said data storage device to another said data storage device as a function of the monitored rates of access.

14. The method of claim 13 further comprising, maintaining a location map table mapping said block numbers provided by said interpreter to said physical blocks at relevant storage devices at which the blocks are actually stored.

15. The method of claim 13 wherein said monitoring includes maintaining, at said hierarchical performance driver, an access rate table for each said storage device, said access rate table listing blocks within the storage device and the number of accesses per unit time for each block.

16. The method of claim 15 further comprising assigning a storage device access rate to each storage device, said storage device access rate defining a threshold that triggers moving a block from one storage device to another.

17. The method of claim 16 further comprising adjusting a said storage device access rate for a storage device in response to access rates of blocks in the next fastest storage device.

18. The method of claim 13 wherein said interpreter comprises a file system of an operating system of said computer.

19. The method of claim 13 wherein said interpreter comprises a database server application.

20. The method of claim 13 wherein said plural data storage devices include local data storage devices and remote data storage devices, and said remote data storage devices are accessed by a remote storage access system, said hierarchical performance driver also having an operating system device driver application programming interface to said remote storage access system, said remote storage access system being implemented in user space of said computer and communicating with said remote data storage devices.

21. The method of claim 20 wherein said remote storage access system and said hierarchical performance driver communicate via IOCTL messages.

22. A computer program for implementation on a computer to provide hierarchical storage of data stored on plural data storage devices comprising physical media, said computer program residing on a computer-readable medium, said computer having an interpreter that maps logical user read and write requests to physical block level read and write requests, each block being the smallest set of data that can be accessed on said physical media, said physical block level read and write requests indicating block numbers for data being requested, said computer program comprising instructions causing said computer to create a hierarchical performance driver having a disk driver interface for receiving said block level read and write requests from said interpreter, said hierarchical performance driver mapping said block numbers into physical blocks at relevant storage devices at which the blocks are actually stored, said hierarchical performance driver issuing instructions to read and write data from said plural data storage devices in response to said block level read and write requests, said plural data storage devices having different data access speeds, said hierarchical performance driver monitoring the rates of access of individual blocks of data stored on said data storage devices and transferring blocks of data from one said storage device to another said data storage device as a function of the monitored rates of access.

23. The computer program of claim 22 wherein said interpreter is a file system of an operating system of said computer.

24. The computer program of claim 22 wherein said interpreter is a database server application.

25. The computer program of claim 22 wherein said plural data storage devices include local data storage devices and remote data storage devices, and wherein said computer program further comprises instructions causing said computer to create a remote storage access system, said hierarchical performance driver also having an operating system device driver application programming interface to said remote storage access system, said remote storage access system being implemented in user space of said computer and communicating with said remote data storage devices.

26. The computer program of claim 25 wherein said remote storage access system and said hierarchical performance driver communicate via IOCTL messages.

27. A computer system providing distributed hierarchical storage of computer data stored on plural data storage devices comprising physical media comprising a network, one or more remote data storage devices that are connected to said network, a computer that is connected to said network, said computer comprising an interpreter that maps logical user write requests to physical block level write requests, each block being the smallest set of data that can be accessed on said physical media, said physical block level read and write requests indicating block numbers for data being requested, one or more local data storage devices, and a hierarchical performance driver having a disk driver interface for receiving said block level read and write requests from said interpreter, said hierarchical performance driver mapping said block numbers into physical blocks at relevant storage devices at which the blocks are actually stored, said hierarchical performance driver issuing instructions to read and write data from said data storage devices in response to said block level read and write requests, said data storage devices having different data access speeds, said hierarchical performance driver monitoring the rates of access of individual blocks of data stored on said data storage devices and transferring blocks of data from one said data storage device to another said data storage device as a function of the monitored rates of access.

* * * * *